No. 610,507. Patented Sept. 6, 1898.
P. H. WHITE.
BACK PEDALING BRAKE.
(Application filed Oct. 4, 1897.)
(No Model.)
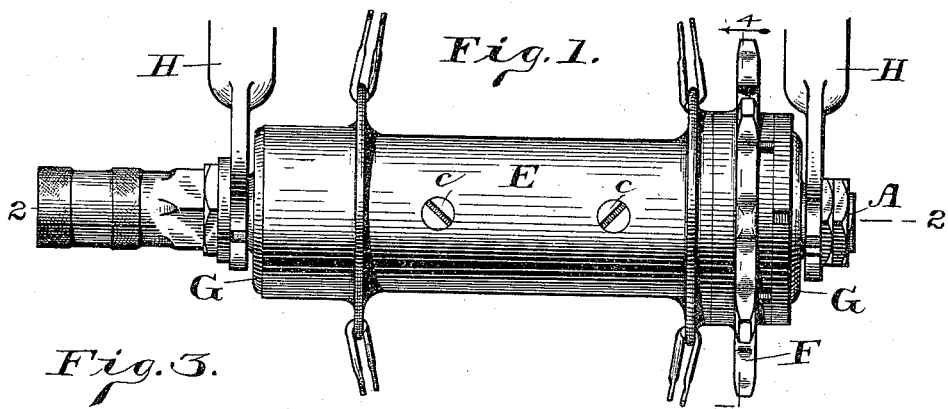
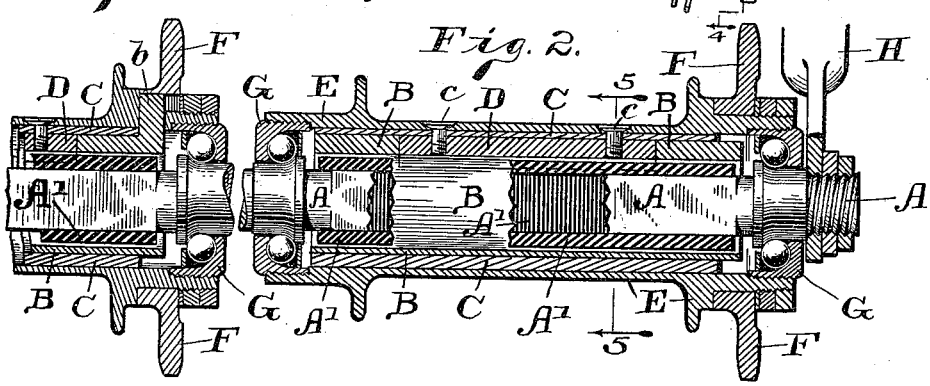
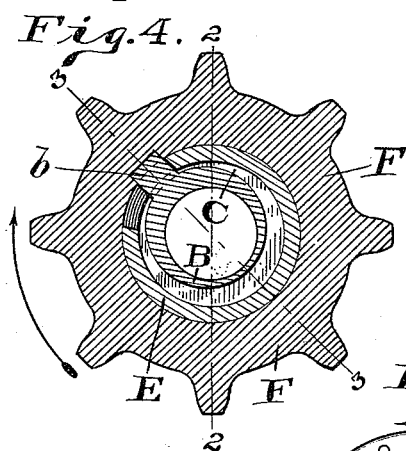
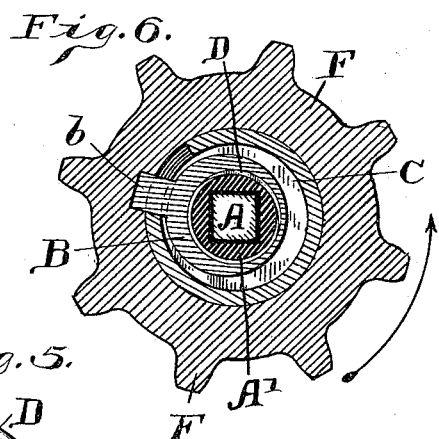
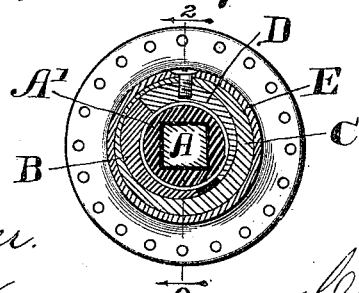
WITNESSES:
F. W. Woerner.
J. A. Walsh.
INVENTOR
Paul H. White,
BY
Chester Bradford,
ATTORNEY.

UNITED STATES PATENT OFFICE.

PAUL H. WHITE, OF INDIANAPOLIS, INDIANA, ASSIGNOR TO THE INDIANA BICYCLE COMPANY, OF SAME PLACE.

BACK-PEDALING BRAKE.

SPECIFICATION forming part of Letters Patent No. 610,507, dated September 6, 1898.

Application filed October 4, 1897. Serial No. 654,049. (No model.)

*To all whom it may concern:*

Be it known that I, PAUL H. WHITE, a citizen of the United States, residing at Indianapolis, in the county of Marion and State of Indiana, have invented certain new and useful Improvements in Vehicle-Brakes, of which the following is a specification.

The object of my said invention is to provide an automatic brake for vehicles, especially that class of light vehicles which are operated by foot-power of the rider, such as bicycles, tricycles, and the like.

It consists in a series of eccentrically-related parts located within the hub of the vehicle and which are operated to act as a clamp or brake by a reverse or retarding operation of the driving means.

Said invention will first be fully described, and the novel features thereof then pointed out in the claims.

Referring to the accompanying drawings, which are made a part hereof, and on which similar letters of reference indicate similar parts, Figure 1 is an exterior view of a bicycle-hub embodying my said invention; Fig. 2, a central sectional view of the same on the dotted line 2 2 in Figs. 1 and 4; Fig. 3, a view similar to a portion of Fig. 2, but on the dotted line 3 3 in Fig. 4; Fig. 4, a sectional view through the sprocket wheel or driver on the dotted line 4 4 in Fig. 1; Fig. 5, a transverse sectional view on the dotted line 5 5 in Fig. 2; and Fig. 6, a view similar to Fig. 4, except that the position of the eccentric parts is shown as changed to that which they occupy during the clamping or braking operation, or, in other words, said parts are here shown in their braking or clamping position.

In said drawings the portions marked A represent the axle of the vehicle; B and C, two eccentrically-formed cylinders, one of which immediately surrounds the axle and the other of which surrounds the first; D, a curved cam-wedge located in a corresponding space in the tube or cylinder B; E, the cylinder or shell of the vehicle traction-wheel hub; F, a driving-wheel (shown as an ordinary sprocket-wheel) mounted on said hub; G, the caps constituting the outer ball-race halves, and H fragments of the vehicle-frame.

In the construction shown the axle, as is common in vehicles, is stationary, while the traction-wheel hub revolves thereon, and said wheel may be understood as being driven by a sprocket chain or belt engaging with the sprocket-wheel F, although I do not desire to be understood as confining myself to this means, as any suitable means of driving may be employed. It may be further said that several of the foregoing parts are or may be in general form similar to corresponding parts in bicycles as usually constructed, and so need not be described in detail. I will therefore only refer to such parts incidentally in describing the invention.

The axle bears the usual cones forming the inner ball-race halves, and its outer ends may also be otherwise of the usual or any desired or approved construction. Centrally I prefer to make the axle substantially square in cross-section, so far as its inner portion or core is concerned, and to place thereon a sleeve or outer portion A' circular in cross-section and composed of some material well adapted to the purpose of a clutch or brake. I have used vulcanized fiber as such a material and find it answers the purpose admirably; but of course I may use any other suitable material or may make the axle integral and all of metal, instead of using a metal core and a different sleeve, without departing from my invention. In other words, this part is an axle merely, having a suitable surface to which to apply the clamps in the braking operation, whether it is made of two parts, as shown, or of a single part only. There is a slight looseness in the ball-bearings which carry the axle, so that in the braking operation said axle is capable of being forced slightly to one side of the center of the hub, so that the surface of the sleeve A' may be driven tightly against the wedge D. I also prefer to mount the sleeve A' somewhat loosely upon the axle A, so that it may have a slight independent lateral movement, whereby it is enabled to be forced more easily and certainly against said wedge D. It is obvious that to provide a slight sidewise movement is important, as the braking is much more effective when the sleeve or axle is clamped upon opposite sides than where the eccentric cylinder is merely driven against or wedged under one side only.

The cylinder B, as already stated, is eccentrically formed, or, in other words, the axis of the bore through the center is to one side of the axis of the complete structure. One side of this cylinder is cut away, leaving an opening of a size preferably about equal to one-third its entire peripheral surface, said opening being for the purpose of receiving the cam-wedge D, as will be presently described. At one end this cylinder is connected to the driving-wheel F, preferably by means of a projecting lug $b$, which engages in a notch formed to receive it in the side of the axial opening through said driving-wheel, as shown in Figs. 3, 4, and 6. A shifting of the position of said driving-wheel thus causes a similar shifting in position of this cylinder and a consequent applying of the braking or clamping parts through the sleeve A', as will be presently more fully described.

The cylinder C is similar in form, generally speaking, to the cylinder B, but is large enough to receive the latter and is somewhat shorter than said cylinder B, so that the lug $b$ may move freely past its end. Said cylinder C is held rigidly to the hub E in operation and might be constructed integrally therewith except for the mechanical difficulty of so constructing it. The parts are so arranged that the axis of the wheel is central to the combined structure. Screws $c$ are shown as the means of securing said cylinder in position, and said screws are also shown as entering and holding the cam-wedge D and as being carried from the hub E.

The cam-wedge D is exactly similar in form to the opening in the side of the cylinder B, except that a portion of what would be the thinner edge of such cut-away portion is omitted altogether, leaving an opening space between the thinner edge of said cylinder within the cut and the thinner edge of said cam-wedge, as shown most plainly in Fig. 5. As also shown in said Fig. 5 and in Fig. 2, said cam-wedge is held rigidly to the eccentric cylinder C and to the hub E, so that in operation it has no movement relatively to said parts.

The shell or hub proper, E, is or may be, generally speaking, of any usual or desired form, except that an opening is provided therein through which the projection $b$ may pass to and be enabled to engage with the driving-wheel F, said opening being somewhat wider circumferentially of the hub than the width of said projection in order to permit the movement required in the operation of braking or clamping.

The driving-wheel F is shown as the usual sprocket-chain wheel commonly placed on the hub of a bicycle, (although it may be any other form of driver so far as my invention is concerned,) except that it is provided with the notch to receive the projection $b$. Instead, however, of being rigidly mounted on the hub it is in itself loosely mounted thereon, but is held from any except a very limited rotary motion in respect to said hub by its engagement with said projection, the limit of movement being not greater than the excess of width of the opening through the hub over the width of said projection.

The operation of this invention may be stated as follows: When the parts are in their normal position, as shown in all the figures of drawings except Fig. 6, there is an open space between the axle (or its shell) and the surrounding parts, and the wheel-hub revolves freely around said axle, being driven in the usual manner by power applied to the driving-wheel F. When, however, it is desired to apply the brake and stop the forward motion of the vehicle, it is done by reversing the motion of or holding back upon said driving-wheel F, which operation throws the parts from the position shown in Fig. 4 to the position shown in Fig. 6, driving the thin edge of the cylinder B around toward the thin edge of the cam-wedge D, thus reducing the orifice and clamping the sides of the sleeve A' or other braking or friction surface provided on or carried by the axle. In the riding of bicycles this is effected by what is known as "back-pedaling," and the result is that the rider has under convenient and absolute control what amounts to an automatic brake without in any way changing his position or being required to manipulate any additional parts. As will be readily seen, the rider neither changes position nor moves in any different manner than where no such appliance is provided.

Having thus fully described my said invention, what I claim as new, and desire to secure by Letters Patent, is—

1. The combination, in a vehicle, of an axle having a suitable friction-surface, a traction-wheel thereon, a driver loosely mounted on the hub of said traction-wheel, two eccentrically-shaped cylinders within the hub and surrounding the axle, one of which surrounds the other, one of said cylinders being also movable circumferentially in respect to the other, and one having a portion of its substance cut away leaving an opening in its side, a cam-wedge secured to the hub and fitting within said opening, and a connection between said movable cylinder and said driver.

2. The combination, in a vehicle, of the axle A having friction-sleeve A', the two eccentrically-formed cylinders B and C, the cam-wedge D positioned in an opening in the side of the cylinder B, the shell-like vehicle-hub within which said parts are contained, the driving-wheel F, and a connection between the inner cylinder and the driving-wheel, said parts being so arranged that the axis of the wheel is central to the combined structure when in normal position, substantially as set forth.

3. The combination, in a vehicle, of an axle having a friction-surface adapted to serve as a member of a brake, a traction-wheel mounted on said axle, a driver loosely mounted on said hub, two eccentrically-shaped cylinders located in the hub and surrounding the axle, one of which surrounds the other, one of said cylinders being also movable circumferentially in respect to the other and adapted to serve as the other member of the brake, and a connection between said movable cylinder and said driver, substantially as and for the purpose set forth.

In witness whereof I have hereunto set my hand and seal, at Indianapolis, Indiana, this 29th day of September, A. D. 1897.

PAUL H. WHITE. [L. S.]

Witnesses:
CHESTER BRADFORD,
JAMES A. WALSH.